United States Patent [19]

Kim

[11] Patent Number: 5,955,797
[45] Date of Patent: Sep. 21, 1999

[54] PORTABLE COMPUTER BEING POWERED BY EITHER A BATTERY PACK OR AN AC ADAPTER

[75] Inventor: Dong-Hwan Kim, Soowon-shi, Rep. of Korea

[73] Assignee: SamSung Electronics Co., Ltd., Kyungki-do, DPR of Korea

[21] Appl. No.: 08/925,192

[22] Filed: Sep. 8, 1997

[30] Foreign Application Priority Data

Sep. 6, 1996 [KR] Rep. of Korea ...................... 96-38726

[51] Int. Cl.$^6$ ....................................................... H02J 7/00
[52] U.S. Cl. ........................... 307/150; 307/64; 439/500
[58] Field of Search ............................... 307/150, 64, 66; 439/500

[56] References Cited

U.S. PATENT DOCUMENTS

| | | | |
|---|---|---|---|
| 4,680,674 | 7/1987 | Moore | 361/686 |
| 5,200,685 | 4/1993 | Sakamoto | 320/103 |
| 5,381,043 | 1/1995 | Kohiyama et al. | 307/116 |
| 5,553,294 | 9/1996 | Nanno et al. | 395/750.08 |
| 5,629,602 | 5/1997 | Makino | 307/66 |
| 5,721,481 | 2/1998 | Narita et al. | 320/111 |
| 5,777,398 | 7/1998 | Valkeakari et al. | |

*Primary Examiner*—Jeffrey Gaffin
*Assistant Examiner*—Jonathan S. Kaplan
*Attorney, Agent, or Firm*—Robert E. Bushnell, Esq.

[57] ABSTRACT

A portable computer incorporates an AC adaptor for providing DC power to the portable computer. Especially, the adaptor is configured to be housed within or detached from the battery pack-receiving bay of the portable computer. Preferably, the AC adaptor includes a second connector electrically connectable to a first connector provided in the battery receiving bay, to form appropriate electrical connection. Also, the AC adaptor has the same configuration as the battery pack. Further, the AC adaptor has a DC jack for receiving a DC plug, and for outputting the DC power at the side of the adaptor provided with said second connector. The DC jack may also be provided on the side of the adaptor opposite to the second connector, when the AC adaptor is mounted in the battery receiving bay. With this arrangement, use of the portable computer becomes more convenient by incorporating the battery pack in a detachable way. Further, when the AC adaptor is installed instead of the battery pack, the continuous usage of the battery pack, i.e., frequent charging/discharging of the battery can be prevented, and thus poor performance and shortening of the battery life can be effectively prevented.

4 Claims, 15 Drawing Sheets

PORTABLE COMPUTER BEING POWERED BY EITHER A BATTERY PACK OR AN AC ADAPTER

CLAIM OF PRIORITY

This application makes reference to, incorporates the same herein, and claims all benefits accruing under 35 U.S.C. § 119 from an application for A PORTABLE COMPUTER earlier filed in the Korean Industrial Property Office on Sep. 6, 1996 and there duly assigned Ser. No. 38726/1996.

BACKGROUND OF THE INVENTION

1. Field of the Invention

The present invention relates to portable computers, and more particularly to a portable computer fabricated in such a manner that an AC adaptor is housed or detached in a battery pack-receiving bay of the portable computer.

2. Description of the Related Art

When ENIAC (Electronic Numerical Integrator And Calculator), using over 20,000 vacuum tubes was marketed as the first computation-oriented computer, its weight was almost 30 tons. Despite limited use in a specific field, a computer has been widely adopted in the general public thanks much to brilliant technological development. In particular, the rapid technological development of semiconductor devices have resulted in making a large-capacity computer much smaller, thus leading to appearance of a personal computer which may be portable for use any place or any time.

A portable computer can be differentiated from a desktop computer in terms of its movability, simplicity, and various functions which may replace a desktop computer.

Thus, if some peripheral devices in the portable computer may be efficiently used, it can be safely said that a portable computer may be in a position to meet the current trends of replacing a desktop computer. The typical portable computer may include laptop computer, notebook computer, and palmtop computer.

Generally, an earlier portable computers, DC power for the computer is either supplied by a battery pack housed within a battery receiving bay formed in the portable computer or from an AC adaptor connected to an external AC power source, the adaptor being connected to the portable computer through a DC outlet cable.

In the absence of external AC power, a portable computer operates with power supply from the battery pack.

On the other hand, when external AC power is available, power is supplied to the portable computer by the AC adaptor and the battery is also charged by the DC power from the AC adaptor.

If the battery pack is always mounted within the portable computer with which the AC adaptor is connected to, an incomplete discharge/charge repetition may induce a memory effect in the battery pack which shortens the battery pack's life.

Although the above-described portable computer was originally device for portable use, in a light of the fact that such portable computers now have almost the same performance as a desk top computer and the convenience of moving and working in a relatively narrow space, there is a trend for a great number of users to prefer a portable computer to a desk top computer.

Nevertheless, the portable computer has an inconvenience in that the AC adaptor must be carried separately and always placed near the portable computer while occupying some area while the battery pack is mounted within the portable computer all the time. Therefore, problems arise in that the AC adaptor is apt to be lost or damaged by careless handling and the battery pack may suffer from degradation and short battery life due to the memory effect.

The Chiou, U.S. Pat. No. 5,567,176, entitled Two-Purpose Power Supply Device For Computers, discloses an AC adaptor which may be disposed either within a portable computer battery receiving bay or connected to the portable computer via a DC power cord.

However, the Chiou patent does not teach or suggest the use of a separate DC jack for supplying the DC power from the AC adaptor to an external device as in the present invention.

The following patents each disclose systems in which some sort of power adaptor is used in place of a battery in a battery chamber. However, none of these patents teaches or suggests the use of a DC jack for supplying the DC power from the AC adaptor to an external device as in the present invention: U.S. Pat. No. 4,847,513 to Katz et al., entitled Power-Operated Device With A Cooling Facility, U.S. Pat No. 5,350,949 to Yazi, entitled Power Supply Interface, U.S. Pat. No. 3,201,742 to English, entitled Electric Connector, U.S. Pat. No. 4,946,396 to Saitoh, entitled Adapter For Connector To External Power Supply, U.S. Pat. No. 5,296,315 to Rein, entitled Device To Permit The Use Of Non-Standard Batteries To Power Battery Operated Devices, and U.S. Pat. No. Des. 367,258 to Olexa Jr., entitled 9.6V Battery Eliminator Cartridge.

SUMMARY OF THE INVENTION

It is therefore an object of the invention to provide a portable computer in which the AC adaptor is incorporated with the computer such that the AC adaptor may be received in the battery pack receiving bay in a detachable way.

According to the present invention, there is provided a portable computer comprising: a battery pack used for a power supply of the portable computer; a battery receiving bay formed in the portable computer for housing the battery pack; a first connector provided in the battery receiving bay and electrically connectable to the battery pack; and an AC adaptor for providing a DC power source for the portable computer by converting an AC power, wherein the AC adaptor includes a second connector electrically connectable to the first connector provided in the battery receiving bay, in order to be housed or detached from the battery receiving bay of the portable computer.

Preferably, the AC adaptor has the same configuration as the battery pack.

Further, the AC adaptor has a DC jack for receiving a DC plug, outputting the DC power supply at the side provided with the second connector. Also, the AC adaptor has a DC jack for an external DC plug, which may supply the DC power to an external device, if necessary, by providing the DC jack on the side of the adaptor opposite to the second connector, when the AC adaptor is mounted in the battery receiving bay.

BRIEF DESCRIPTION OF THE DRAWINGS

This invention may be understood and its object and advantages will become apparent to those skilled in the art by reference to the accompanying drawings as follows.

DETAILED DESCRIPTION OF PREFERRED EMBODIMENTS

Figure 1A:
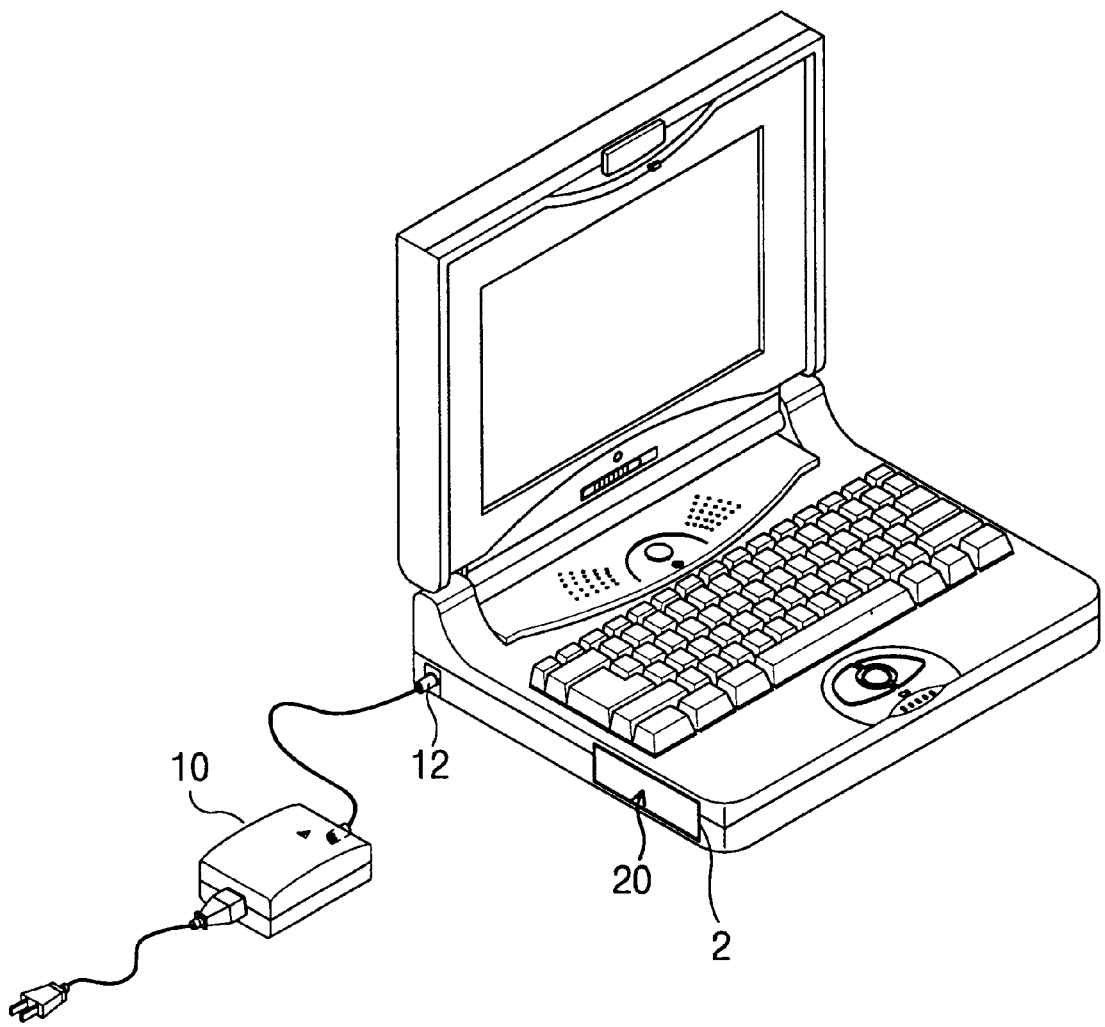
FIG. 1A is a diagram depicting the structure of a portable computer using an earlier AC adaptor.

Generally, the portable computer, as illustrated in FIG. 1A, is capable of using external AC power through an AC adaptor 10, and a battery pack 20 is mounted in a battery receiving bay 2 formed in the portable computer; the AC adaptor 10 has an AC inlet cord and a DC outlet cable with a plug 12.

Figure 1B:
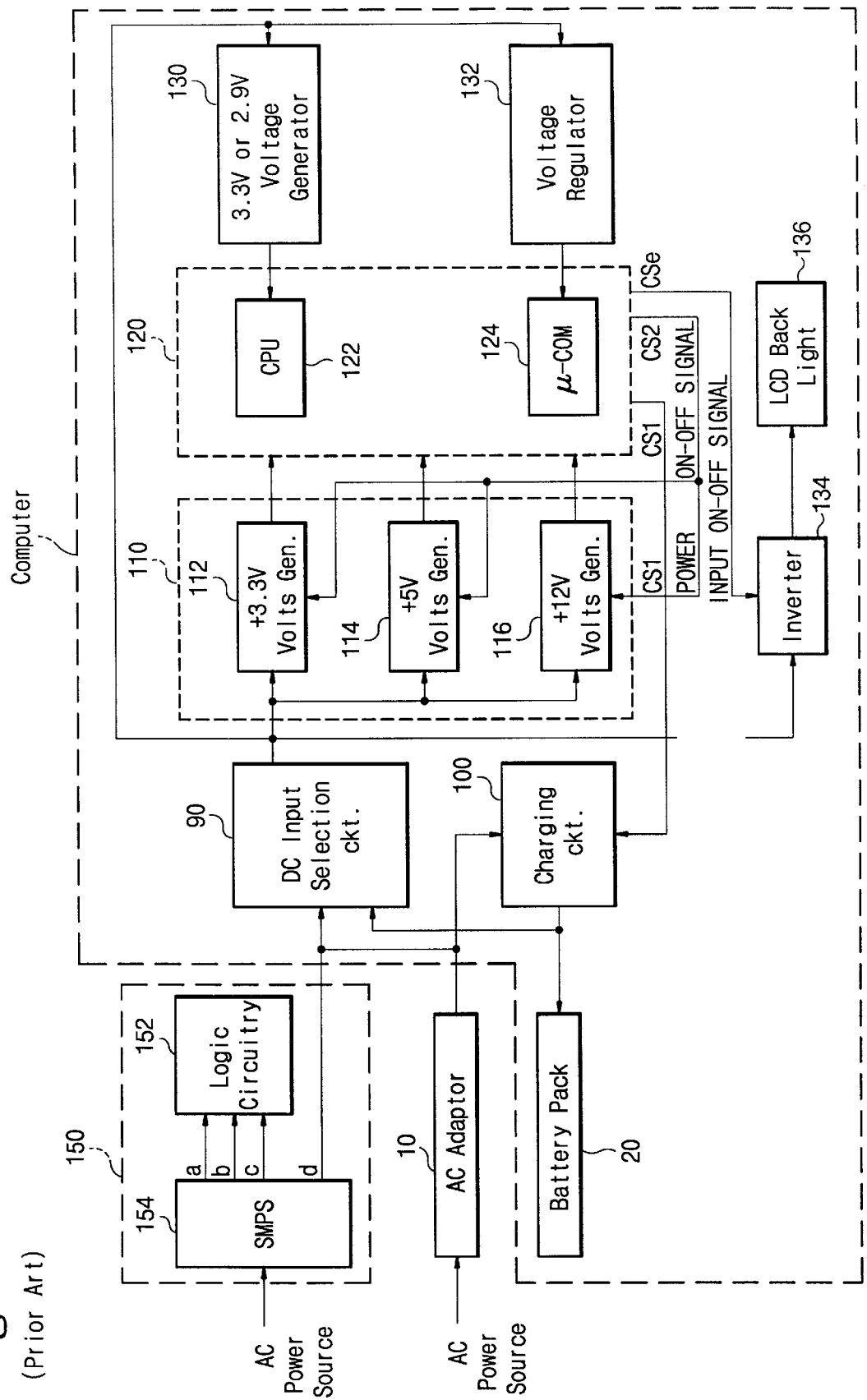
FIG. 1B is a schematic block diagram showing a power supply system of an earlier portable computer.

FIG. 1B shows a circuit configuration of a power supply system used in earlier portable computers, incorporating the docking station provided for enhancing the expandability of the portable computer. There, the power supply system comprises a DC input selection circuit 90 for selectively outputting DC power provided from an AC adaptor 10 and a battery pack 20; a charging circuit 100 for supplying a DC power outputted from the AC adaptor 10 to the battery pack 20 in order to charge the battery pack 20; a DC—DC converter 110 which outputs various levels of DC voltage required for use in the portable computer by converting the power supplied from the DC input selection circuit 90; and a logic circuit 120 including a microprocessor 124 designed for controlling power distribution and the charging/discharging operation of the battery pack 20.

Further, the power supply system includes a voltage regulator 132 for supplying the operating voltage of the microprocessor 124, and a voltage generator 130 for supplying the required operating voltage for a CPU 122 of the portable computer. Also, an inverter 134 is provided for supplying a high AC voltage to a backlight lamp 136 of the LCD display panel. In general, the LCD lamp 136 uses a voltage with a frequency of 20–60 kHz and an amplitude of about 400–500 Volts AC.

The above power supply system preferably incorporates a docking station 150 which will be described later.

In operation, the output voltage of the AC adaptor 10 is established such that the voltage is substantially higher than that of the battery pack 20 of a full charge state, in order to charge the battery pack 20. The battery pack 20 is composed of a plurality of rechargeable battery cells and used for supplying the power to the portable computer when AC power is unavailable. Usually, the battery pack uses Ni—Cd, Ni—MH, of Li-ion batteries.

When power from both the AC adaptor 10 and from the battery pack 20 are simultaneously supplied, the DC input selection circuit 90 separates the power sources to accept the power from the AC adaptor 10, and to perform a charging operation for the battery pack 20 .

The charging circuit 100 charges the battery pack 20 using the DC output of the AC adaptor 10 or a docking station 150 as a power source. The charging circuit 100 may include a constant voltage supply circuit and a constant current supply circuit.

The microprocessor 124, formed as a one chip microcomputer is provided to perform the PMS (power management system) function. In other words, when a computer is operated with the power from the battery pack 20, the microprocessor 124 performs various power-saving functions so as to maximize the operating time of the portable computer. If the user leaves the portable computer on during the operating of a program for a preset time, the computer is subsequently operated in a low power consumption mode. Subsequently, the computer will store the present data in a RAM (random access memory) or HDD (hard disk drive), and the disk drives which consume a large amount of electric power are turned off. Then, the microprocessor 124 is placed in a suspended state.

In particular, the regulator 132 is a linear constant voltage supply circuit provided solely for driving the microprocessor 124. Since the portable computer is usually intended to use a soft on-off switch instead of a line on-off switch, stand-by power must be constantly provided, when power from the battery pack 20 or AC adaptor 10 is supplied. Thus, the regulator 132 is installed so as to provide the stand-by power.

Meanwhile, referring to FIG. 1B again, the docking station 150 is provided to expand the functions of the portable computer. The docking station 150 comprises logic circuitry 152 for controlling the various functions of the docking station 150, and a switching mode power supply (SMPS) 154 providing various levels of DC voltage required for the logic circuitry 152 from an AC power source.

Among the output terminals a~d in the SMPS 154, the output terminals a, b and c are intended to output +3.3v, +5v and +12v, respectively, and the output terminal d is to output the same level of DC voltage as the output voltage provided by the AC adaptor 10, thus providing power to the portable computer.

Figure 2A:
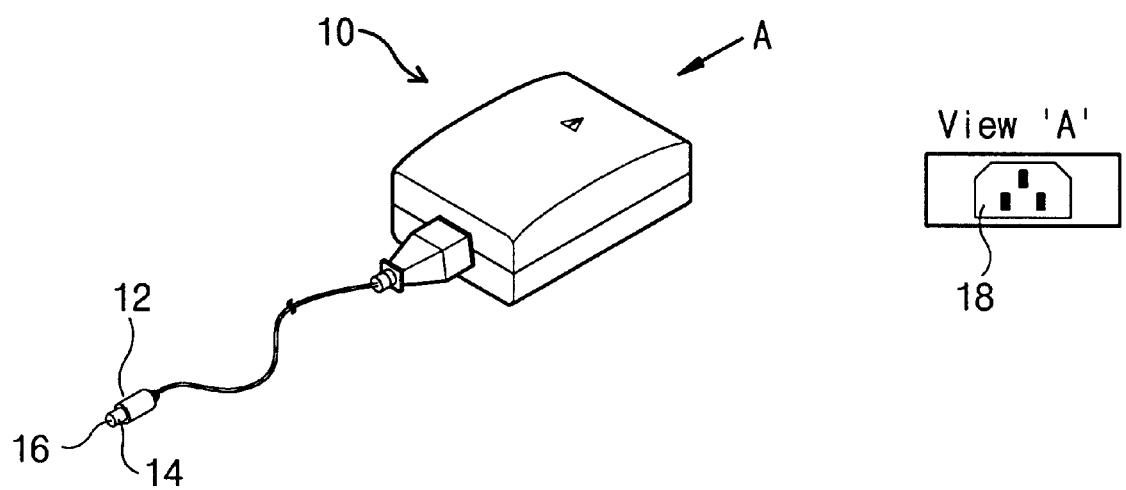
FIG. 2A is a view showing an earlier AC adaptor.
Figure 2B:
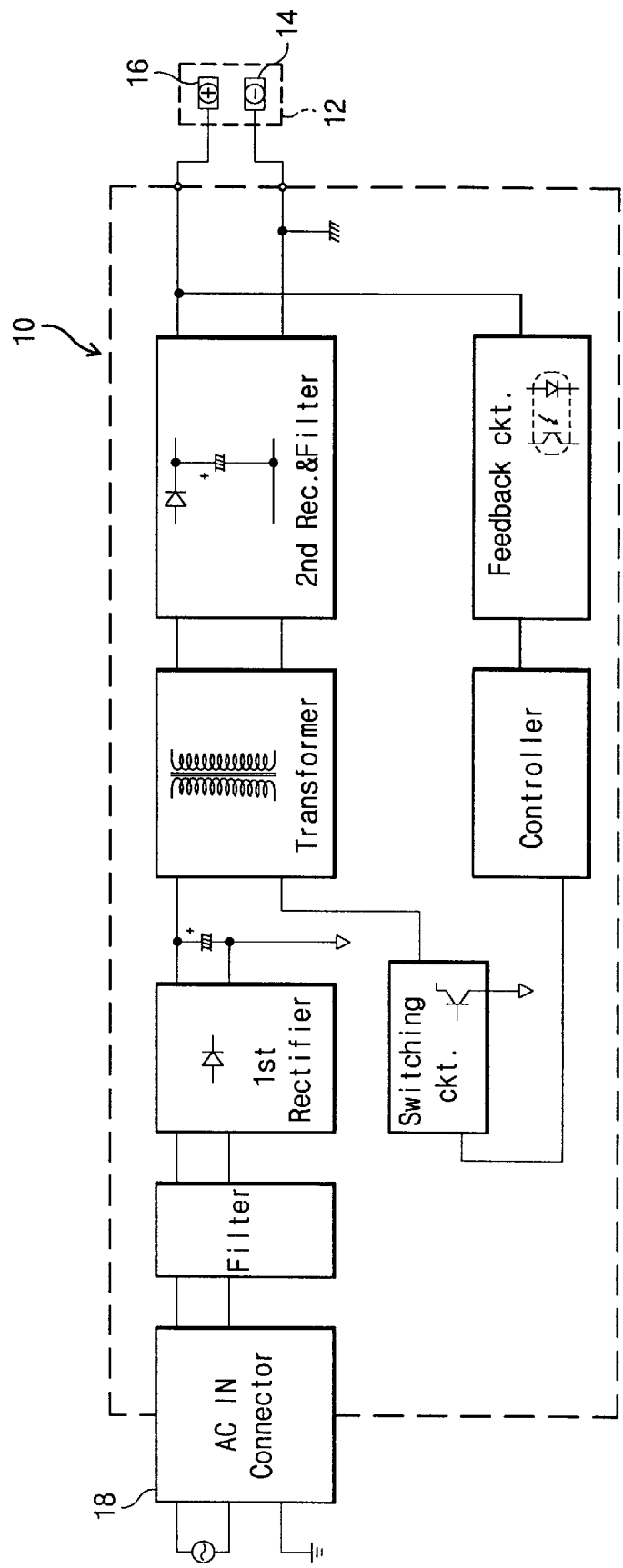
FIG. 2B is a schematic block diagram showing the circuit configuration of the AC adaptor shown in FIG. 2A.

Referring to FIGS. 2A and 2B, there is shown a configuration of an earlier AC adaptor 10. Reference number 12 denotes a DC plug for delivering the DC power outputted from the AC adaptor 10 to a portable computer, while one end of the DC plug is formed at the opposite end of a DC output cable fixed to the AC adaptor 10; reference number 14 denotes a negative (−) terminal of the DC plug 12; reference number 16 denotes a positive (+) terminal of the DC plug 12; reference number 18 denotes an AC input connector connected to a AC inlet cord.

Figure 3A:
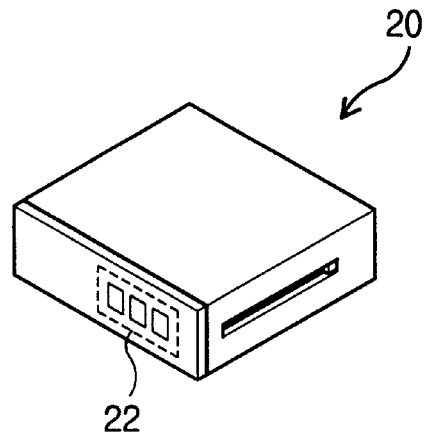
FIG. 3A is a schematic view showing a battery pack used in the portable computer.
Figure 3B:
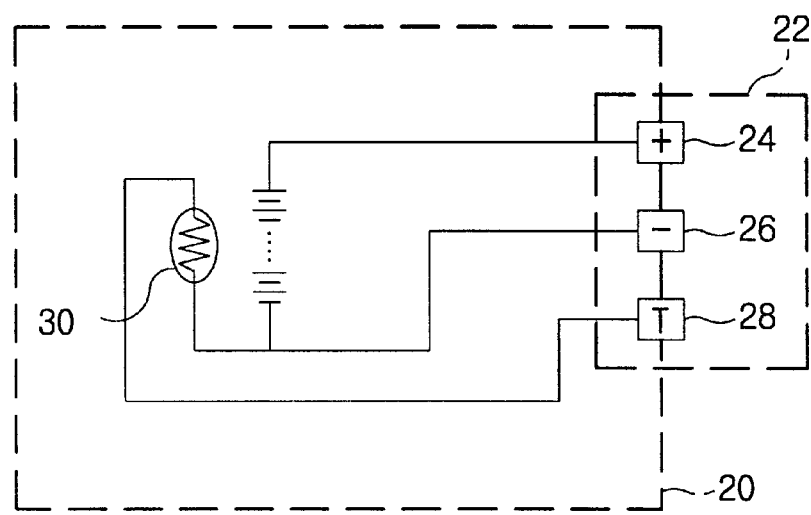
FIG. 3B is a circuit diagram of the battery pack shown in FIG. 3A.

Also, referring to FIGS. 3A and 3B, there is shown an earlier battery pack incorporated with the portable computer. Reference number 20 denotes a battery pack; reference number 22 denotes a connector designed for connecting to the portable computer; reference number 24 denotes a positive (+) terminal; reference number 26 denotes a negative (−) terminal; reference number 28 denotes a temperature sensing terminal; and reference number 30 denotes a thermistor for sensing the temperature of the surface of the battery cells.

As apparent, the AC adaptor 10 is used, always located external to the computer, while the battery pack 20 is mounted in the battery receiving bay 2 of the portable computer. If the battery pack 20 is always mounted in the portable computer with which the AC adaptor 10 is connected for use thereof, the incomplete discharge-charge repetition may induce a memory effect which shortens the battery packs' life.

Although the above described portable computer was originally devised for portable use, however, in the light of the fact that the portable computer has the same performance as a desktop computer and the convenience of moving and working in a relatively narrow space, there is a trend that a great number of end-users prefer the portable computer to a desktop computer.

Nevertheless, the aforementioned portable computer has an inconvenience in that the AC adaptor must be carried separately and always placed near the portable computer while occupying some area, while the battery pack 20 is mounted within the portable computer all the time. Therefore, problems arise in that the AC adaptor is apt to be lost and damaged by careless handing, and the battery pack 20 may suffer from degradation and short battery life due to the memory effect.

The invention will be explained in more detail as set forth hereunder by referring to the attached drawings FIGS. 4A–4C, FIGS. 5A–5B, and FIGS. 6A–6B. When the constituent elements have the same functions as those of the portable computer illustrated in FIGS. 1A–1B and FIGS. 2A–2B, they shall have the same reference numerals.

According to the first preferred example of this invention, an AC adaptor may be housed in or detached from the receiving bay of battery pack in a portable computer. This adaptor includes some connectors especially designed for connecting to the portable computer.

Figure 4A:
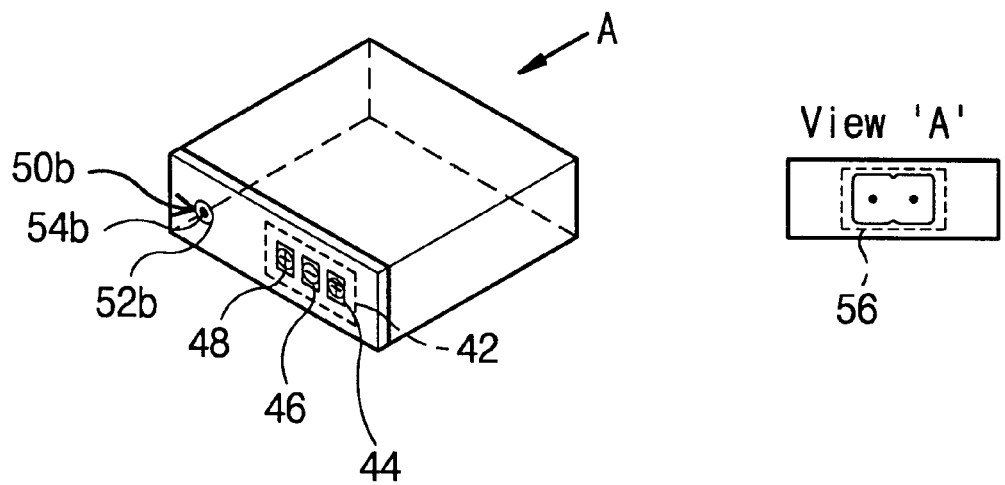
FIG. 4A is a view showing an AC adaptor according to the first embodiment of this invention.
Figure 4C:
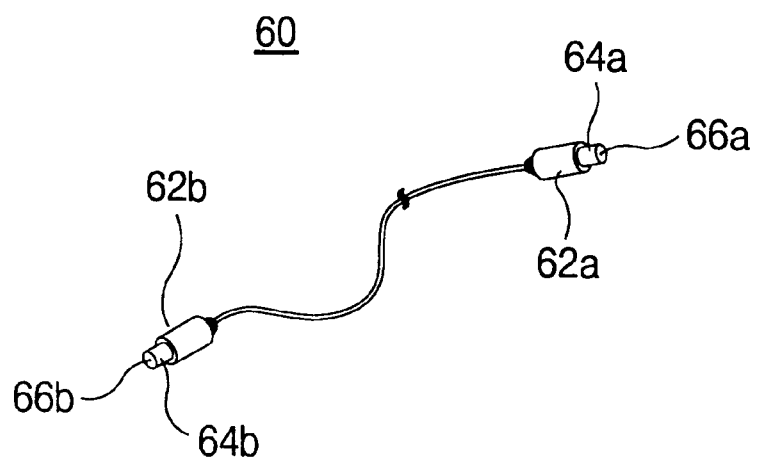
FIG. 4C is a view showing a DC output cable used in the AC adaptor of this invention.

In FIG. 4A, the AC adaptor 10 is mounted in the battery pack receiving bay 2 of the portable computer. The AC adaptor 10 includes a second connector 42 designed for providing a DC power, being connected to a connector formed in the battery pack receiving bay 2 of the portable computer; a DC jack 50b designed for providing DC power, being connected to the outside of the portable computer at the same side where the second connector 42 is installed; and an AC input connector 56 designed for connecting to an AC power cord on the opposite site where the second connector 42 is formed.

Figure 4B:
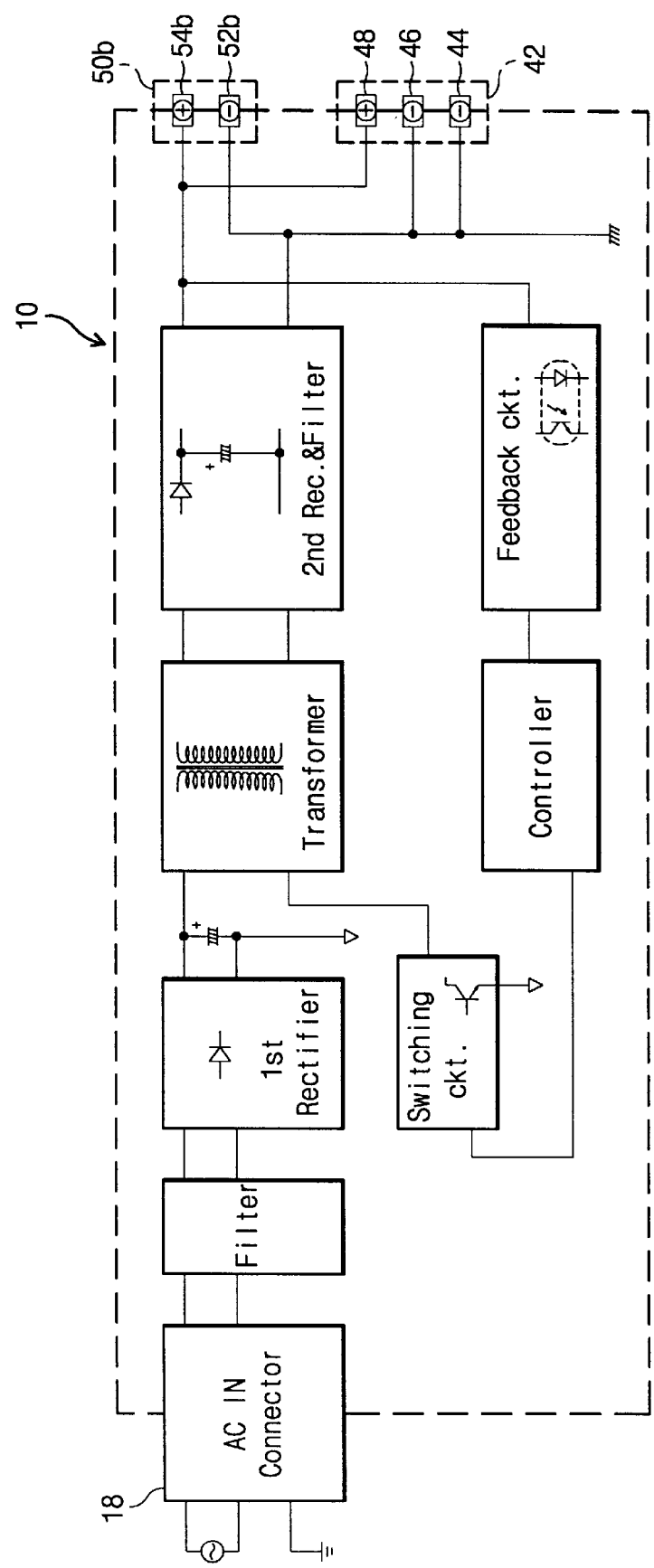
FIG. 4B is a schematic block diagram showing the circuit configuration of the AC adaptor illustrated in FIG. 4A.

Also, referring to FIG. 4B, when the AC adaptor 10 is mounted in the battery pack receiving bay 2 of the portable computer, the temperature sensing terminal 44 in the second connector 42 is internally grounded in order to output a zero voltage.

Figure 5A:
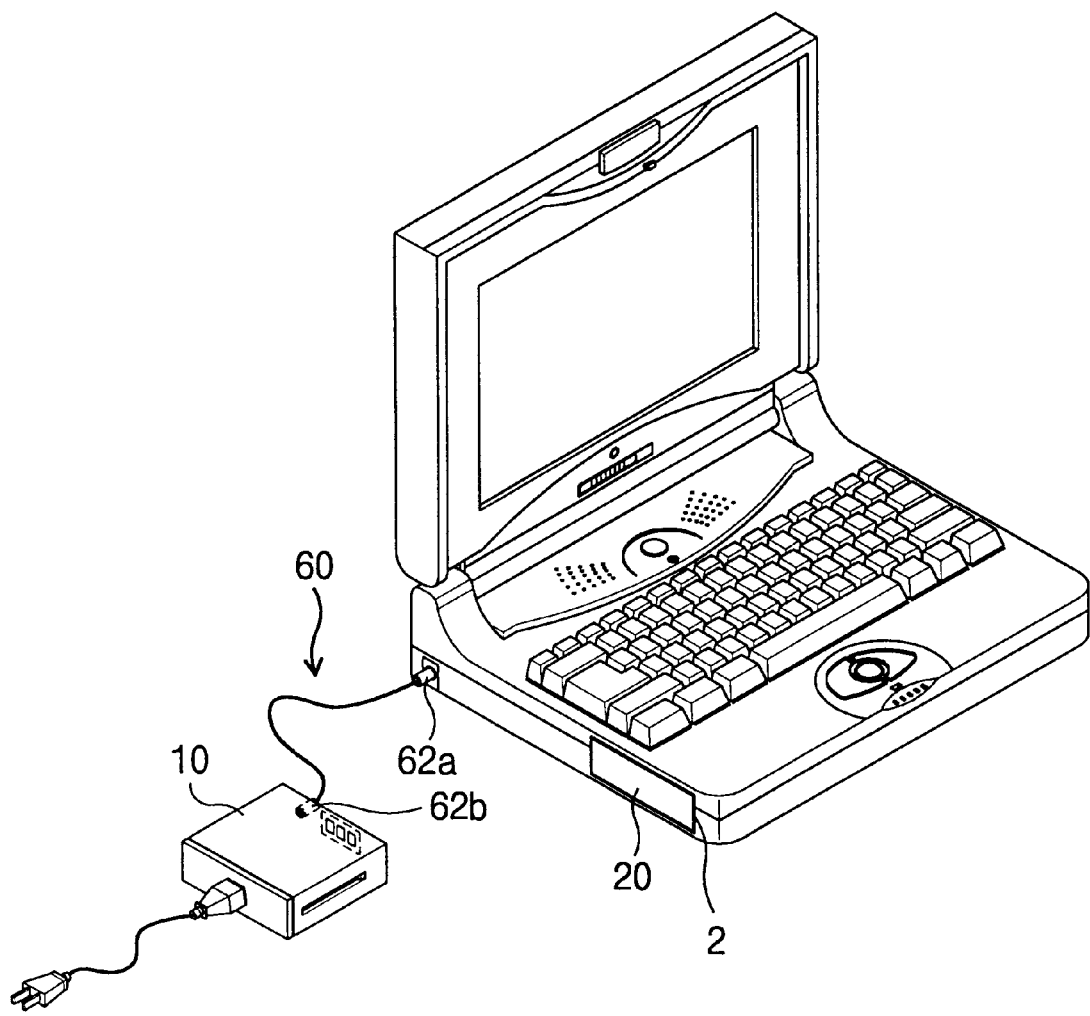
FIG. 5A is a schematic view depicting a first usage of the AC adaptor according to the first embodiment of this invention.
Figure 5B:
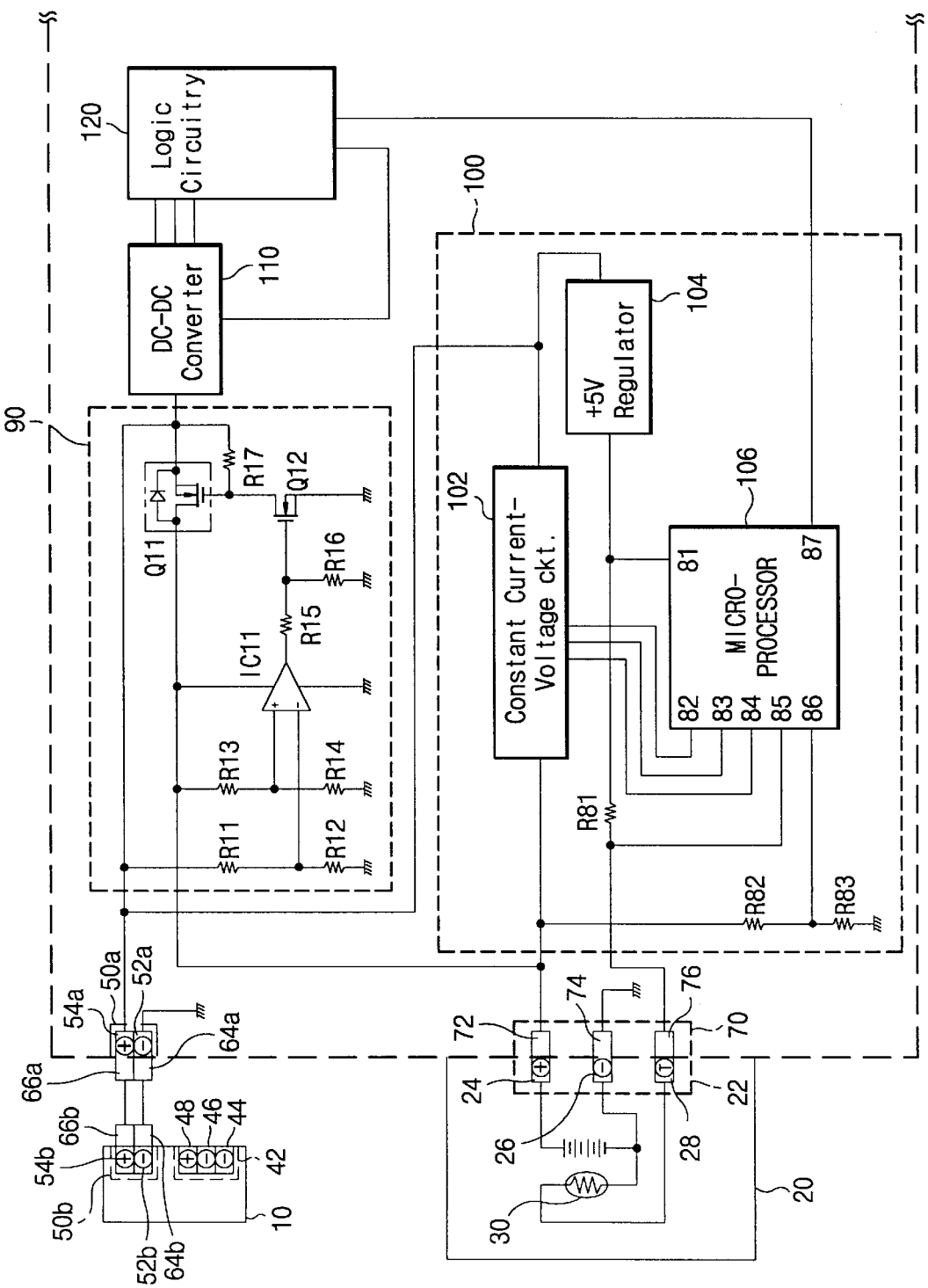
FIG. 5B is a schematic circuit diagram showing the power supply system of the portable computer corresponding to the first usage shown in FIG. 5A.

FIG. 5A depicts a first usage of the AC adaptor according to the first embodiment of this invention, and FIG. 5B shows the power supply system of the portable computer corresponding to the first usage shown in FIG. 5A.

Referring to FIG. 5A, there is shown the AC adaptor 10 intended to use according to the first embodiment of this invention and constructed in such a manner that the AC adaptor 10 is connected external to the portable computer and the battery pack 20 is mounted in the battery receiving bay 2 of the portable computer for charging thereof. Hence, the AC adaptor 10, using the DC output cable 60 of a separatable type, is connected to the portable computer.

Also, referring to FIG. 5B, when the battery pack 20 is mounted in the battery receiving bay 2, the temperature sensing terminal 76 is connected to the thermistor 30 in the battery pack 20. Hence, the temperature sensing terminal 76 reveals the voltage divided by a resistance R81 in the charging circuit 100 and the thermistor 30. When a voltage appears at the temperature sensing terminal 76, the portable computer will perceive that the battery pack 20 is mounted.

Figure 6A:
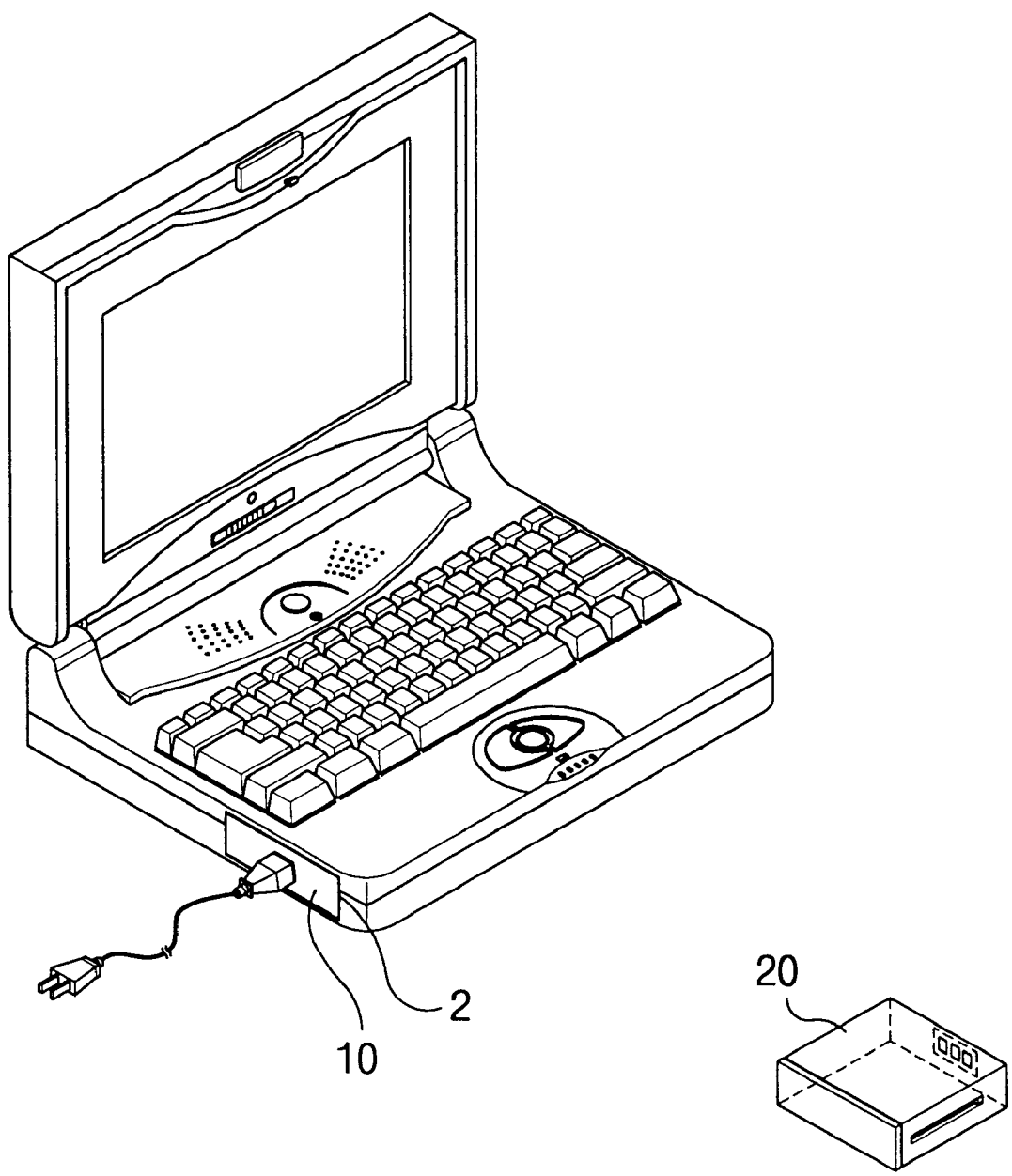
FIG. 6A is a schematic view depicting a second usage of the AC adaptor shown in FIG. 4A.

FIG. 6A depicts a second usage of the AC adaptor according to the first embodiment of this invention.

Referring to FIG. 6A, there is shown the AC adaptor 10 designed to use according to the first embodiment of this invention and constructed in such a manner that after removing the battery pack 20 from the battery receiving bay 2, the AC adaptor 10 is mounted in the battery receiving bay 2 of the portable computer for use. Hence, the AC adaptor 10 omits the DC output cable 60 of the separatable type and is connected to a first connector 70 of the battery receiving bay 2.

Figure 6B:
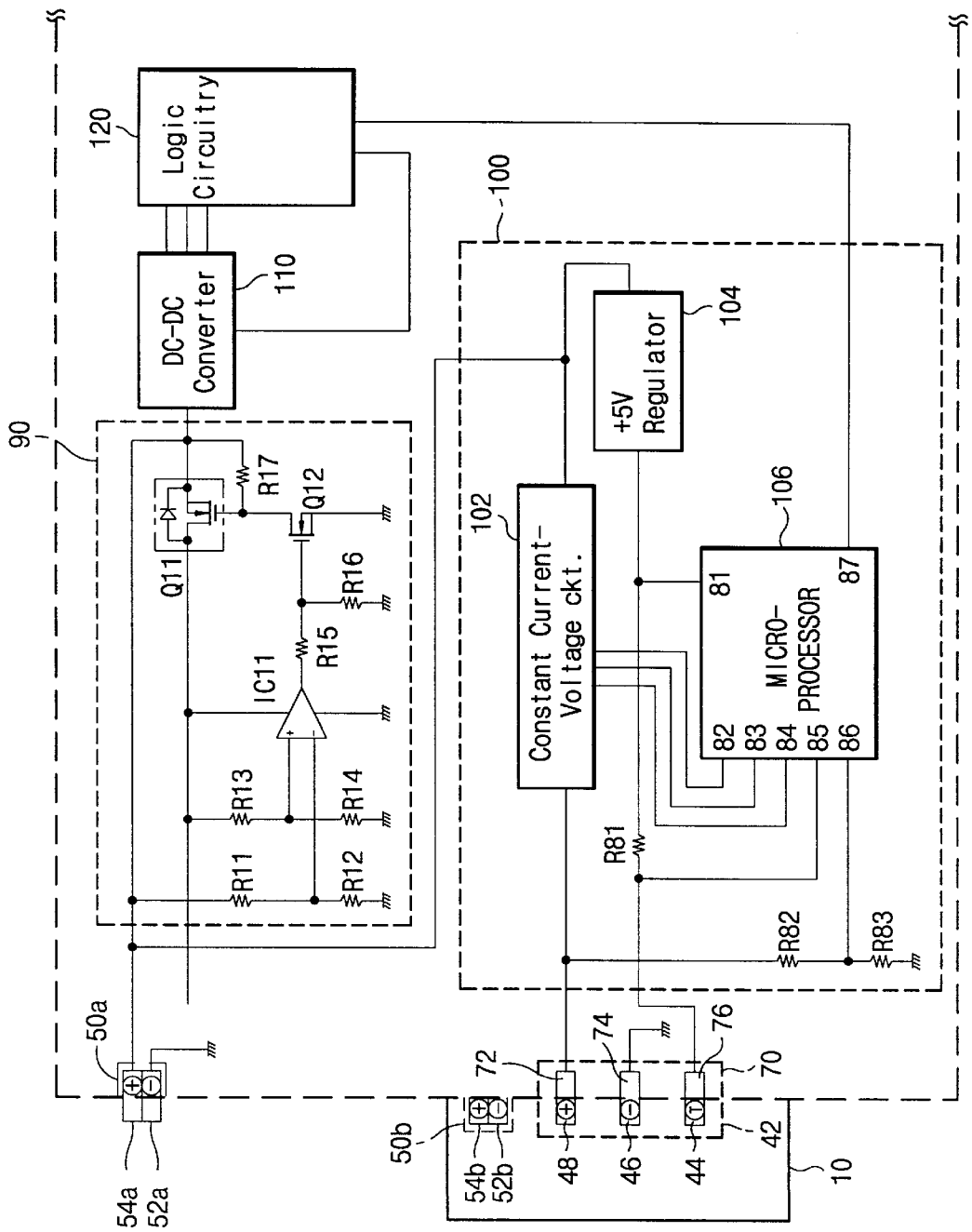
FIG. 6B is a schematic circuit diagram showing the power supply system of the portable computer corresponding to the second usage shown in FIG. 6A.

Also, referring to FIG. 6B, when the AC adaptor 10 is mounted in the battery pack receiving bay 2, the first connector 70 installed in the battery receiving bay 2 is connected to the second connector provided in the AC adaptor 10. Hence, since the portable computer embodies each different function of power supply in accordance with various power supplies inputted, it shall perceive the kinds of power supply accurately. As previously mentioned, this computer has various power-saving functions for minimizing the power consumption of the portable computer so as to extend the operating time of the battery during its operation, as well as the automatic data saving function.

Therefore, appropriate means and methods designed for accurately perceiving the kinds of input power supplies in the portable computer must be considered.

According to this invention, therefore, a sensing means and microprocessor 106 installed in the charging circuit 100 are utilized in order that the kind of input power may be perceived by the portable computer. The presence of the battery pack 20 may be perceived by the portable computer by means of a terminal 85 in the microprocessor 106, detecting the voltage generated at both a resistor R81 of the charging circuit 100 and the thermistor 30 of the battery pack 20 and perceiving the temperature in the battery pack 20. The temperature data may be used as an information to control the charging operation. Also, the presence of the AC adaptor 10 may be perceived in such a manner that for a sensing means, two resistors R82 and R83 are provided in the charging circuit 100 and the voltage generated at the resistor R83 is read via terminal 86 of the microprocessor 106. Hence, the voltage generated at the resistor R83 is the one divided by the resistors R82 and R83 in order to sense the voltage supplied to the portable computer via the second connector 70.

Therefore, the kinds and voltages of input power supply may be perceived more accurately via the terminals 85 and 86 of the microprocessor 106.

Figure 7A:
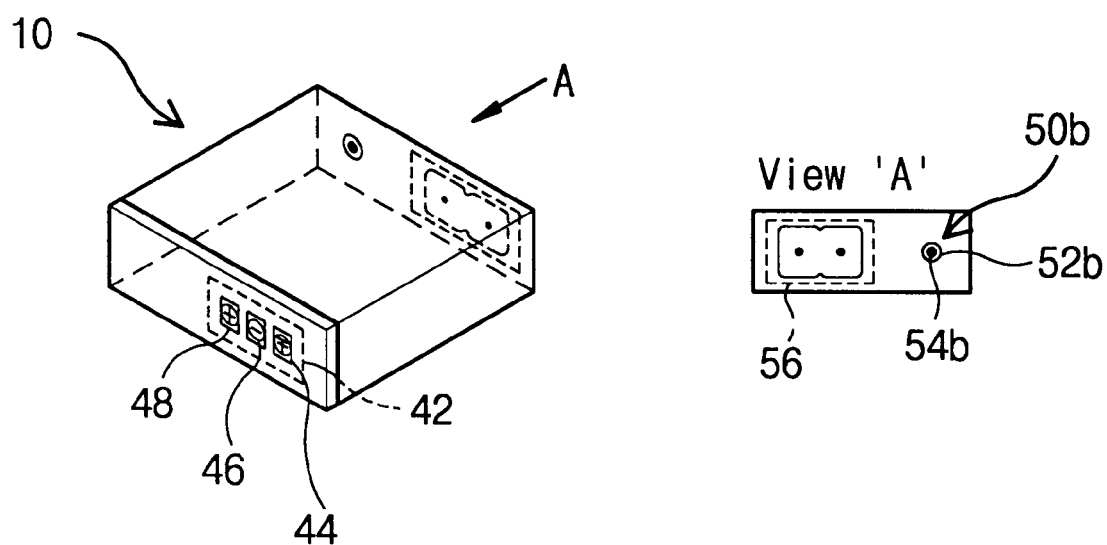
FIG. 7A is a view showing an AC adaptor according to the second embodiment of this invention.
Figure 7B:
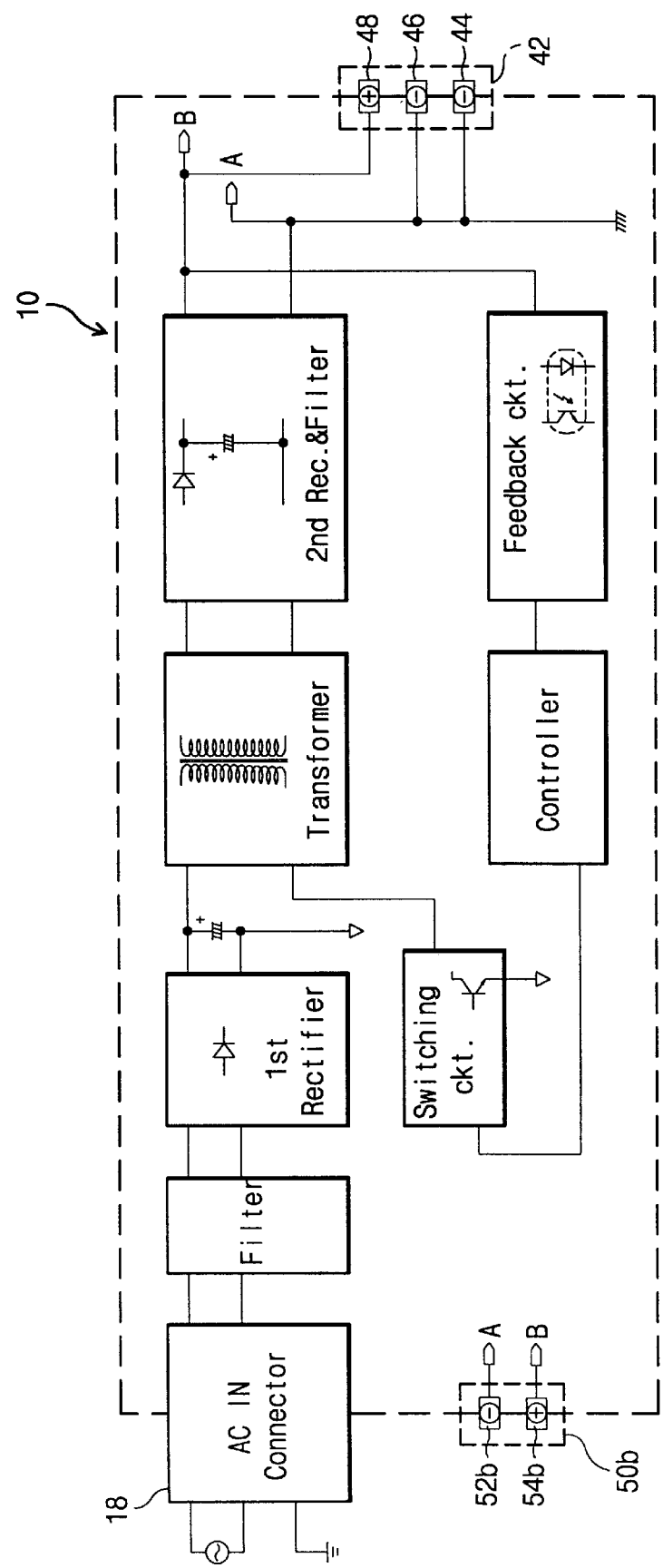
FIG. 7B is a schematic circuit diagram of the AC adaptor illustrated in FIG. 7A.

FIG. 7A shows an AC adaptor according to the second embodiment of this invention. Referring to FIGS. 7A and 7B, the AC adaptor 10 is formed such that it may be housed or detached from the battery receiving bay 2 of the portable computer; the AC adaptor 10 includes a second connector 42 formed at one side of the adaptor, being connected to terminals of the portable computer to provide the power; a DC jack 50b provided opposite to the second connector 42; and an AC input connector 56 is provided on the side where the DC jack 50b is installed. In this arrangement of the portable computer, when the AC adaptor 10 is mounted in the battery receiving bay 2 of the portable computer, the AC adaptor 10 may also be used by connecting to other systems such as a speaker and cassette recorder.

Figure 8:
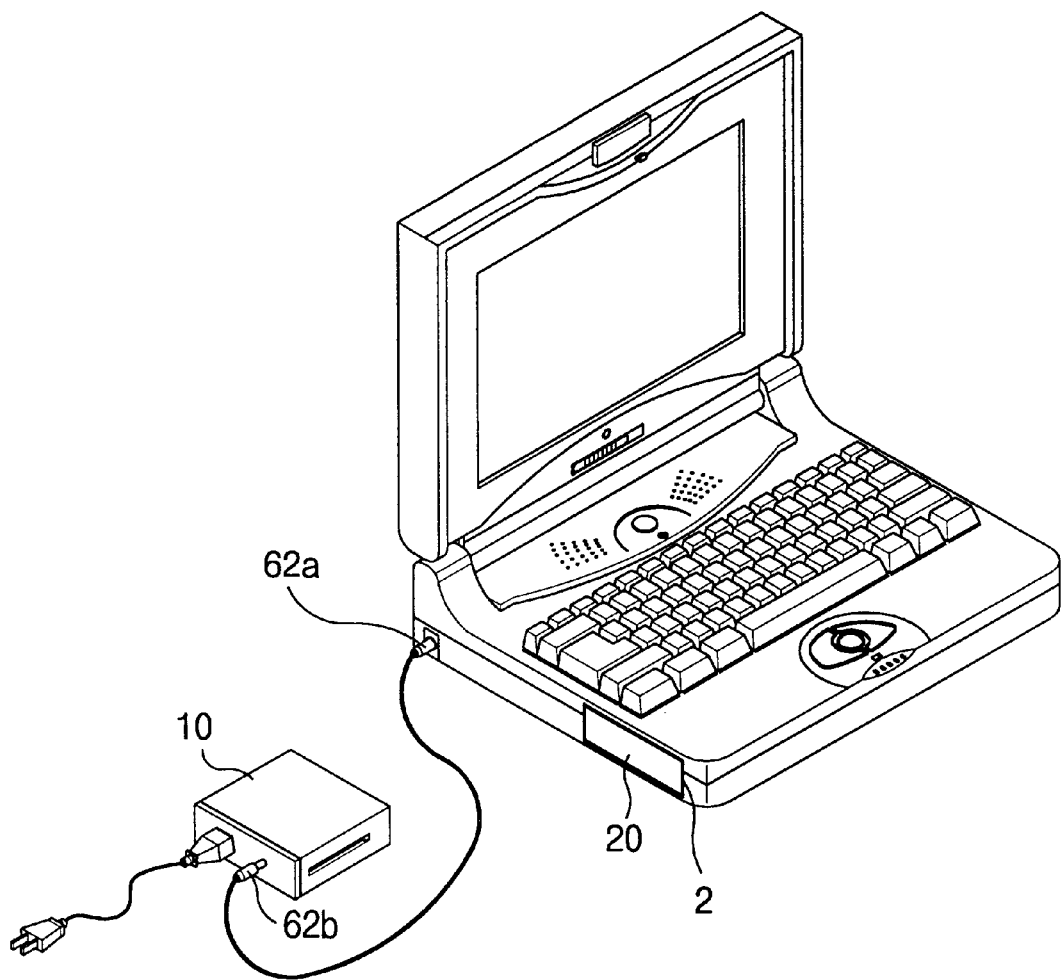
FIG. 8 is a view depicting a first usage of the AC adaptor shown in FIG. 7A.

Referring to FIG. 8, the first structure of the portable computer using the AC adaptor according to the second embodiment of this invention is characterized in that the battery pack 20 is installed in the battery receiving bay 2 of a portable computer, the AC adaptor is connected external to the portable computer.

Figure 9:
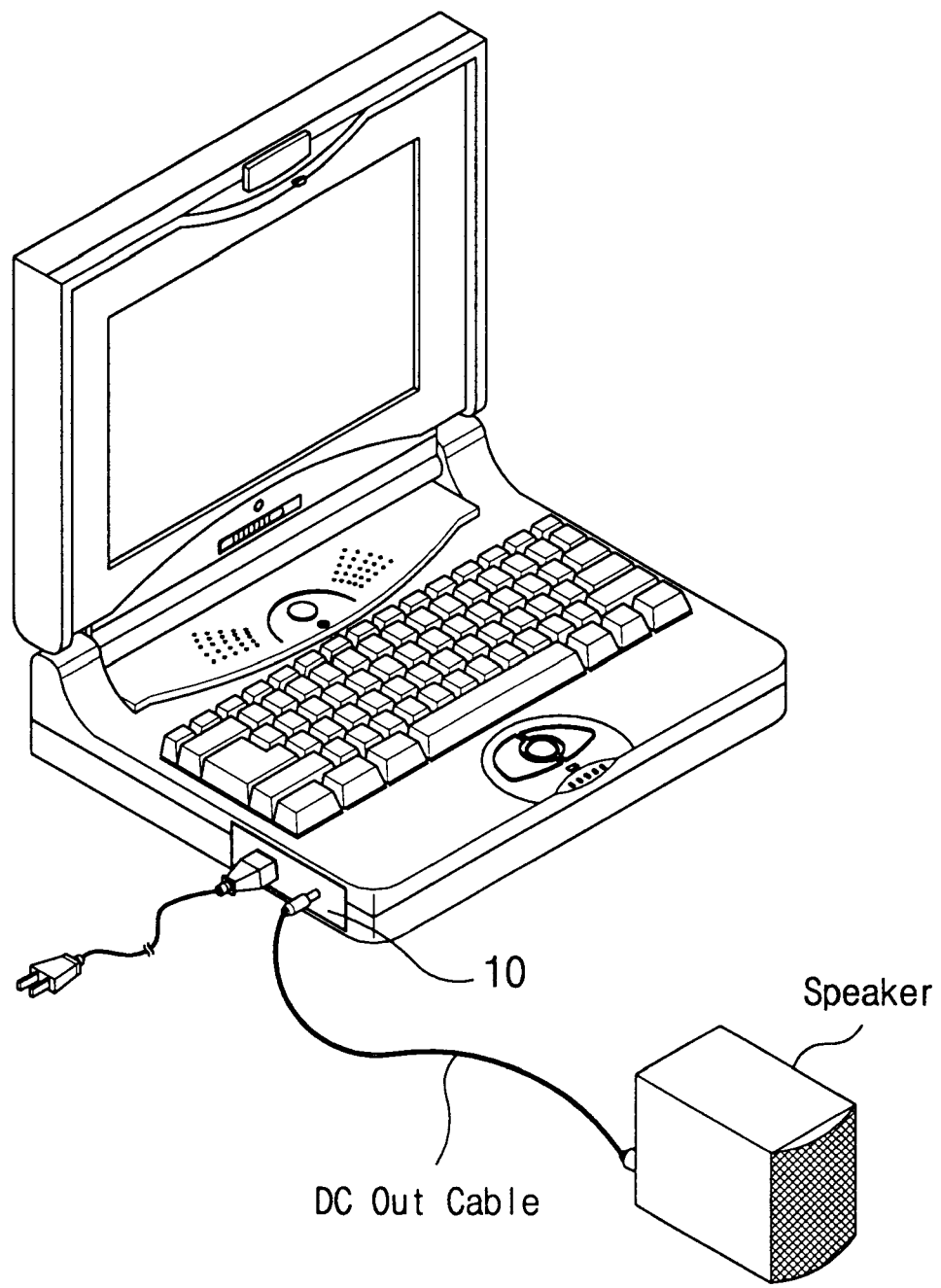
FIG. 9 is a view depicting a second usage of the AC adaptor of FIG. 7A.

Referring to FIG. 9, the second structure of a portable computer using the AC adaptor according to the second embodiment of this invention is characterized in that the AC adaptor is mounted in the battery receiving bay 2 of the portable computer and the DC output cable 60 of the separatable type is connected to the DC jack 50b installed in the front of the AC adaptor, for use with a speaker.

As apparent from foregoing, the portable computer of the present invention incorporates the AC adaptor which may be housed or detached from the battery pack receiving bay. With this arrangement, the use of the portable computer becomes more convenient by incorporating the battery pack in a detachable way. Further, when the AC adaptor is installed instead of the battery pack, the continuous usage of the battery pack, i.e., frequent charging/discharging of the battery can be prevented, and thus poor performance and shortening of the battery life can be effectively prevented.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A portable computer, comprising:

a battery pack used for supplying power to the portable computer;

a battery receiving bay disposed within the portable computer for housing said battery pack;

a first connector disposed within said battery receiving bay and electrically connectable to said battery pack;

an AC adaptor for providing DC power for the portable computer by converting an AC power input thereto, said AC adaptor including a second connector electrically connectable to said first connector so as to be housed or detached from said battery receiving bay of the portable computer; and a DC jack for an external DC plug, for supplying the DC power to an external device, said DC jack being disposed at a side of the AC adaptor which is outwardly faced and opposite to said second connector, when said AC adaptor is housed within said battery receiving bay.

2. A portable computer as set forth in claim 1, further comprising a sensing means for perceiving whether or not the DC power is being provided to the computer when said AC adaptor is housed within said battery receiving bay.

3. A portable computer as set forth in claim 2, said sensing means comprising a voltage detector coupled to said DC power, and a microprocessor for determining whether or not said AC adaptor is housed within said battery receiving bay by comparing a detected voltage of said sensing means to an internal reference voltage.

4. A portable computer provided with a battery pack receiving bay for receiving a detachable battery pack, the portable computer including an AC adaptor to be housed within or detached from said battery pack receiving bay, said AC adaptor supplying a DC power from an external AC power source connected thereto to the portable computer and to a DC jack disposed on an exposed side of said AC adaptor upon said AC adaptor being housed within said battery pack receiving bay.

* * * * *